(12) United States Patent
Henry

(10) Patent No.: US 11,223,185 B2
(45) Date of Patent: Jan. 11, 2022

(54) MODULAR CABLE PROTECTOR WITH EASY OPEN LID

(71) Applicant: Stephen K. Henry, Billings, MT (US)

(72) Inventor: Stephen K. Henry, Billings, MT (US)

( * ) Notice: Subject to any disclaimer, the term of this patent is extended or adjusted under 35 U.S.C. 154(b) by 470 days.

(21) Appl. No.: 16/372,192

(22) Filed: Apr. 1, 2019

(65) Prior Publication Data

US 2019/0229506 A1    Jul. 25, 2019

Related U.S. Application Data

(63) Continuation-in-part of application No. 16/037,831, filed on Jul. 17, 2018, now Pat. No. 10,396,539.

(60) Provisional application No. 62/652,024, filed on Apr. 3, 2018.

(51) Int. Cl.
*H02G 3/04* (2006.01)
*H02G 9/02* (2006.01)

(52) U.S. Cl.
CPC .......... *H02G 3/0418* (2013.01); *H02G 9/025* (2013.01)

(58) Field of Classification Search
CPC ............ H02G 9/04; H02G 3/34; H02G 9/025; H02G 3/0418; H02G 3/0437; H02G 3/04; H02G 3/00; H02G 3/0406; H02G 3/263; H02G 9/00; H02G 9/02; H02G 3/22; H02G 3/30; H02G 3/36; B66F 15/00; E01C 5/226; E01C 13/04; E01C 9/086
USPC ...... 174/68.1, 101, 97, 70 C, 70 R, 68.3, 95, 174/72 R, 75 R; 248/74.1, 74.2, 68.1, 49; 14/69.5; 52/220.1, 220.8, 220.7
See application file for complete search history.

(56) References Cited

U.S. PATENT DOCUMENTS

| | | |
|---|---|---|
| 585,540 A | 6/1897 | Spangler |
| 3,888,186 A | 6/1975 | Jentzsch et al. |
| 5,095,822 A | 3/1992 | Martin |
| 5,523,529 A | 6/1996 | Holliday |
| 5,777,266 A | 7/1998 | Herman et al. |
| D412,490 S | 8/1999 | Henry |
| 6,499,410 B1 * | 12/2002 | Berardi ............... H02G 9/02 104/275 |
| 6,747,212 B1 | 6/2004 | Henry |
| 7,145,079 B1 | 12/2006 | Henry |

(Continued)

FOREIGN PATENT DOCUMENTS

| | | | | |
|---|---|---|---|---|
| CN | 203807909 | * | 9/2014 | ............. E01C 9/08 |
| WO | WO-2016153734 A1 | * | 9/2016 | ............. E01C 9/086 |

OTHER PUBLICATIONS

China Hao, www.chinahao.com, photos of cable protectors, downloaded Mar. 10, 2019.

(Continued)

*Primary Examiner* — Angel R Estrada
(74) *Attorney, Agent, or Firm* — Dorr, Larson & Birney PC

(57) ABSTRACT

A modular cable protector system has a cable protector with a lid that can be easily opened using a tool to removably engage a number of tool engagement features on the cable protector. For example, the tool engagement features can be openings or slots in the upper surface of the cable protector having undercuts extending horizontally beneath the lid from the lower portion of the openings. The tool can have an elongated vertical member with a horizontal protrusions at its lower end that can be inserted into the openings with the horizontal protrusions extending into the undercuts beneath the lid.

12 Claims, 7 Drawing Sheets

(56) References Cited

U.S. PATENT DOCUMENTS

| | | |
|---|---|---|
| 7,309,836 B2 | 12/2007 | Lubanski |
| 7,385,139 B2 | 6/2008 | Lubanski |
| 7,595,450 B2 | 9/2009 | Lubanski |
| 7,810,197 B1 | 10/2010 | Anthony |
| 7,939,759 B2 | 5/2011 | Henry |
| 7,943,851 B2 | 5/2011 | Lubanski |
| 8,001,643 B1 | 8/2011 | James |
| 8,119,914 B2 | 2/2012 | Lubanski |
| 8,288,652 B2 | 10/2012 | Lubanski |
| 8,309,850 B2 * | 11/2012 | Henry .................. H01R 25/164 174/68.1 |
| 8,434,739 B1 | 5/2013 | Connolly |
| D717,248 S * | 11/2014 | Coffman ...................... D13/155 |
| 9,059,574 B2 | 6/2015 | Coffman et al. |
| 9,103,075 B2 * | 8/2015 | Kaylor ................... E01C 9/086 |
| 9,438,022 B2 | 9/2016 | Lioi |
| 9,673,601 B2 | 6/2017 | Coffman et al. |
| 10,396,539 B2 * | 8/2019 | Henry ..................... H02G 3/34 |
| 2016/0023873 A1 | 1/2016 | Kasan |

OTHER PUBLICATIONS

Beyond Sound & Lighting, www.beyondsl.com.au, photo of cable protector, downloaded Mar. 10, 2019.
Unimat Industries, LLC, www.unimattraffic-usa.com, photos of cable protectors, downloaded Mar. 10, 2019.
Bronson Safety, www.bronsonsafety.com.au, photo of cable protector, downloaded Mar. 10, 2019.
Cables Ties and More, www.cablestiesandmore.com, photo of cable protector, downloaded Mar. 10, 2019.
Nanjing Skypro Rubber & Plastic Co. Ltd., www.globalsources.com/skypro.co, photo of cable protector, downloaded Mar. 10, 2019.
Jackwin Safety, jackwinsafety.en.made-in-china.com, photo of cable protector, downloaded Mar. 10, 2019.
Tourgo, www.tourgosolution.com, photo of cable protector, downloaded Mar. 10, 2019.

* cited by examiner

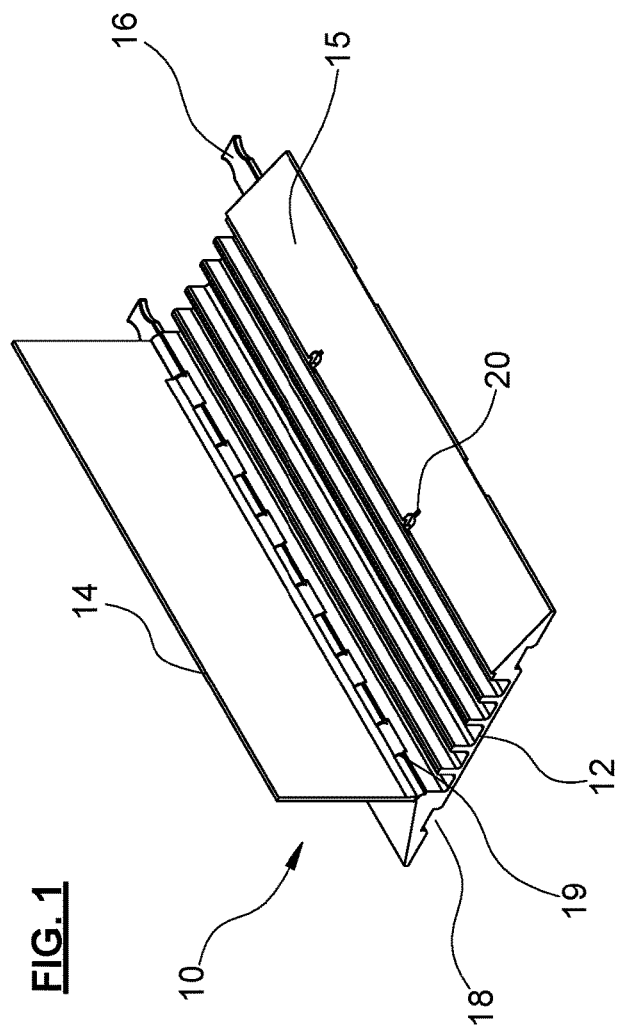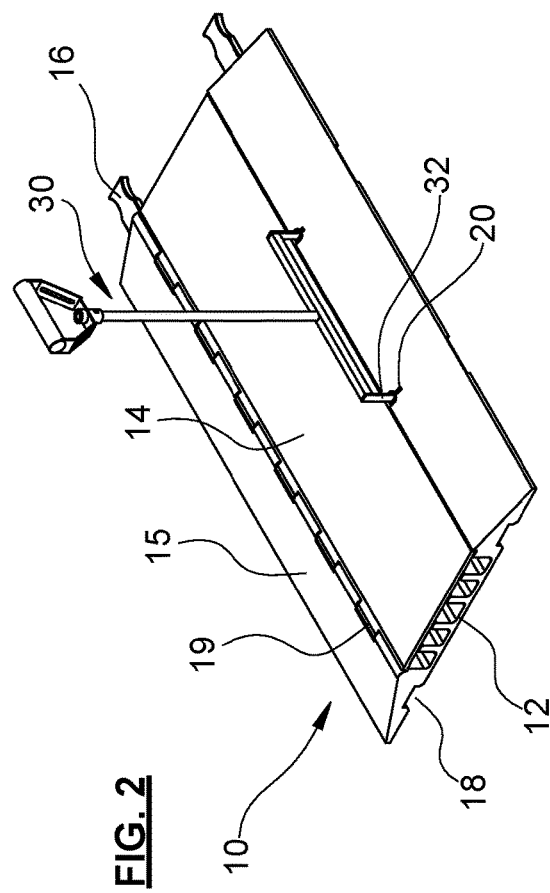

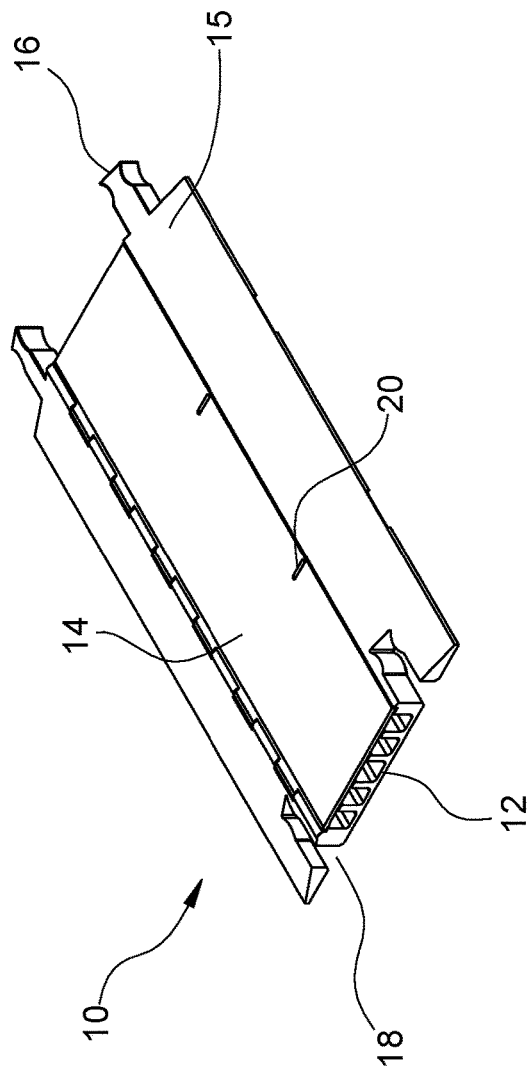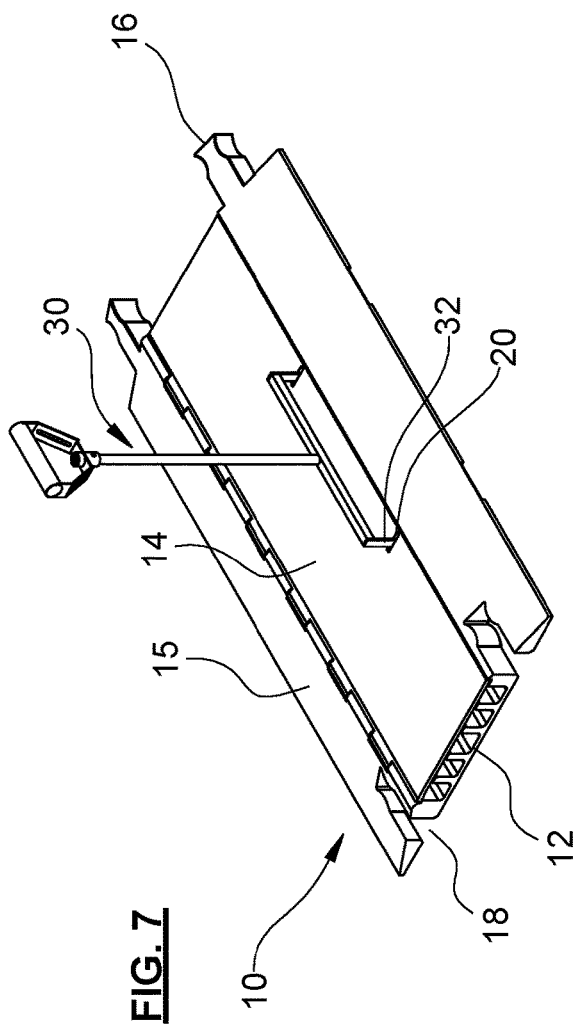

MODULAR CABLE PROTECTOR WITH EASY OPEN LID

RELATED APPLICATIONS

The present application is based on and claims priority to the Applicant's U.S. Provisional Patent Application 62/652,024, entitled "Modular Cable Protector," filed on Apr. 3, 2018. The present application is also a continuation-in-part of the Applicant's U.S. patent application Ser. No. 16/037,831, entitled "Modular Cable Protector," filed on Jul. 17, 2018, which is based on and claims priority to U.S. Provisional Patent Application 62/542,523, filed on Aug. 8, 2017, and U.S. Provisional Patent Application 62/568,005, filed on Oct. 4, 2017, and U.S. Provisional Patent Application 62/594,144, filed on Dec. 4, 2017.

BACKGROUND OF THE INVENTION

Field of the Invention

The present invention relates generally to the field of modular cable protectors. More specifically, the present invention discloses a modular cable protector having tool engagement features for removably engaging a tool that allows a user to open the lid without bending over.

Statement of the Problem

Modular cable protectors have been used for many years to protect cables, hoses, wiring and fiber optics from vehicular traffic and to minimize trip hazards for pedestrians. Cable protectors are frequently used at public events, such as concerts and sports events. Cable protectors are also used in factories, warehouses, mines and other situations where temporary cables, hoses and the like are deployed.

U.S. Design Pat. No. 412,490 (Henry) shows an example of a modular cable protector that has been widely used in the industry. As shown in the accompanying figures, a modular cable protector 10 typically includes a number of parallel, recessed channels 12 extending between the ends of the cable protector for carrying cables, hoses, wiring or the like. A lid 14 covers the channels 12 and forms at least a portion of the top surface of the cable protector when the lid 14 is closed. The lid 14 typically pivots about a hinge 19 running along one side so that the lid 14 can be raised to provide access to the channels 12. Two opposing side ramps 15 guide traffic over the cable protector.

Complementary sets of end connectors 16 and 18 at the ends of the cable protector enable multiple cable protectors to be connected in series. For example, the cable protector shown in the Henry design patent features complementary male and female end connectors that are generally T-shaped. Several other end connector shapes are also commonly used. These cable protectors can be strung together in series to any desired length by engaging the complementary male and female connectors 16, 18 at the ends of the cables protectors. Large numbers of these cable protectors are often used at large sports or music venues.

The problem is that continually bending over to open the lids of multiple cable protectors connected in series can be very labor intensive. The installation typically requires a crew of workers to initially place and connect the cable protectors. All of the lids of the cable protectors must be opened before running cables in the channels. The lids are then closed. After the end of the event, these steps are repeated in reverse order. Although the lids are typically hinged to the cable protectors, this process of repeatedly opening and closing the lids of hundreds of cable protectors can be tedious and time consuming. Considering that each cable protector is only a few inches tall, the workers must repeatedly bend over or squat to open the lids of each cable protector.

Solution to the Problem

The present invention addresses this problem by providing a modular cable protector having tool engagement features for removably engaging a tool that can be used to quickly and easily lift the lid of the cable protector while the user remains standing.

For example, the tool engagement features can be a set of openings and undercuts extending beneath the lid that enable a worker using a tool to quickly and easily open the lid while standing. In one embodiment, a set of openings or slots can extend downward from the top surface of the cable protector adjacent to the side edge of the lid. The bottom of each slot has a horizontal undercut extending beneath the lid. The worker can insert a tool into the slots to engage the underside of the lid and then exert an upward force to open the lid. In this embodiment, the tool can have vertical rods that fit into the slots, with horizontal protrusions at the bottom of the rods to engage the undercuts beneath the lid.

SUMMARY OF THE INVENTION

This invention provides a modular cable protector having a number of parallel channels for carrying cables and the like covered by a lid, with complementary end connectors at each end for removably engaging adjacent cable protectors in series. The cable protector also includes a number of tool engagement features that can be removably engaged by a tool to enable a user to exert an upward force to lift the lid while standing. For example, the tool engagement features can be openings or slots formed in the top surface of the cable protector with horizontal undercuts extending beneath the lid. The tool can be removably inserted into these openings so that protrusions on the lower end of the tool extend into the undercuts beneath the lid. The user can then open the lid by exerting an upward force on the tool.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 1 is a top axonometric view of a modular cable protector 10 with the lid 14 open.

FIG. 2 is a top axonometric view of the cable protector 10 corresponding to FIG. 1 with the lid 14 closed and a tool 30 inserted into the openings 20 in the cable protector 10.

FIG. 6 is a top axonometric view of an alternative embodiment of a cable protector 10 with slots 20 in the lid 14.

FIG. 7 is a top axonometric view of the cable protector 10 corresponding to FIG. 6 with the lid 14 closed and the tool 30 inserted into the slots 20.

DETAILED DESCRIPTION OF THE INVENTION

Figure 3:
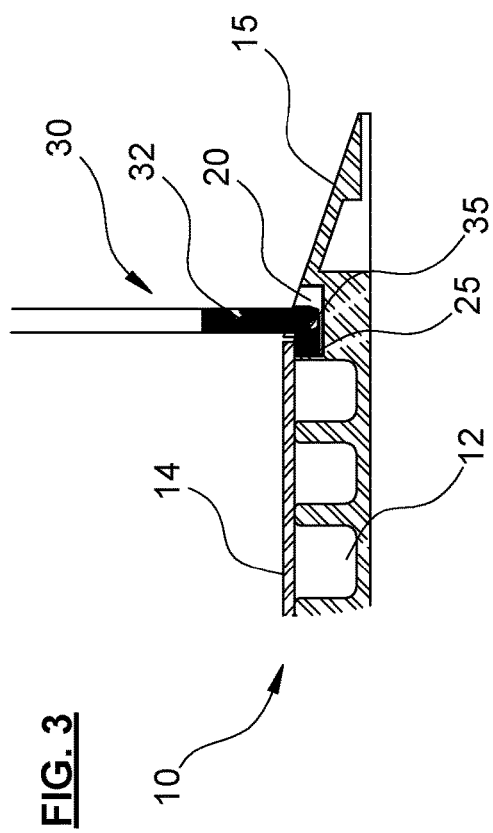
FIG. 3 is a detail vertical cross-sectional view of a portion of a cable protector with the lower end of a tool 30 inserted into an opening 20.

FIGS. 1 and 2 are axonometric views showing an embodiment of the present modular cable protector 10. The body of the cable protector 10 includes a number of parallel, recessed channels 12 extending between its ends for carrying cables, hoses, wiring or the like. Two opposing side ramps 15 on either side of the channels 12 guide traffic over the cable protector 10. Complementary sets of end connectors 16, 18 at the ends of the cable protector 10 enable multiple cable protectors to be connected in series with the channels 12 of the cable protectors in alignment. This specific embodiment has male end connectors 16 at one end and complementary female end connectors 18 at the other end of the cable protector 10. Other shapes and configurations could be readily substituted for these end connectors 16, 18.

A lid 14 covers the interior channels 12 when it is closed as illustrated in FIG. 2. In contrast, FIG. 1 shows the cable protector 10 with the lid 14 open to allow access to the channels 12. In the embodiment show in the accompanying figures, the lid 14 is substantially rectangular with two opposing side edges running adjacent to the side ramps 15. The lid 14 is rotatably connected to the cable protector 10 by a hinge 19 along one side of the lid 14. When closed, the top surfaces of the lid 14 and side ramps 15 define substantial portions of the upper surface of the cable protector 10 as shown in FIG. 2.

The cable protector 10 includes a number of tool engagement features accessible on the upper surface of the cable protector 10 that can be removably engaged by a tool 30, as will be discussed in greater detail below. In the embodiment shown in FIGS. 1-3, the tool engagement features are slots or openings 20 that extend downward from, or through the upper surface of the cable protector 10. Preferably, the slots 20 are located on the lid 14 or side ramps 15 adjacent to the side edge of the lid 14 opposite the hinge 19. These tool engagement features can be located on either the lid 14 or side ramps 15 adjacent to the side edge of the lid 14 opposite the hinge 19.

Each opening 20 has an undercut 25 extending horizontally from the lower portion of the opening 20 beneath the lid 14, as shown in FIG. 3. For example, the undercut 25 can pass through the vertical wall of the cable protector 10 adjacent to the outermost channel 12, so the undercut 25 effectively extends beneath the lid 14 into the outermost channel 12 adjacent to the side ramp 15. However, this might allow the horizontal protrusions 35 on the tool 30 to interfere with cables or other contents in the outermost channel 12. Therefore, the preferred configuration of the undercut 25 would not penetrate into the outermost channel 12.

In another embodiment of the present invention, the opening 20 extends downward and through the lid 14 into at least one of the channels 12 beneath. Here, the undercut 25 is defined by the lip created on the bottom surface of the lid 14 at the bottom edge of the opening 20.

Figure 4:
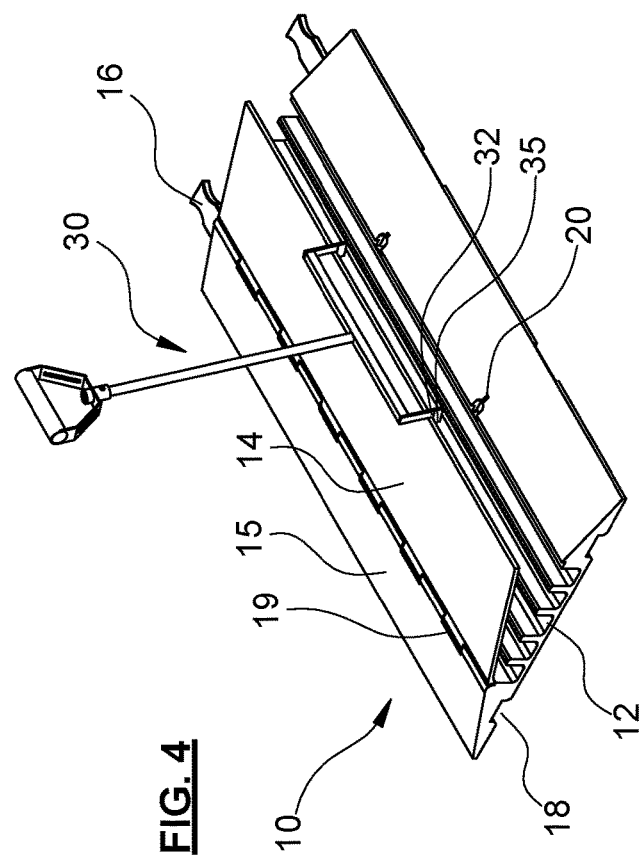
FIG. 4 is a top axonometric view of the cable protector 10 corresponding to FIG. 2 showing the tool 30 being used to open the lid 14.
Figure 5:
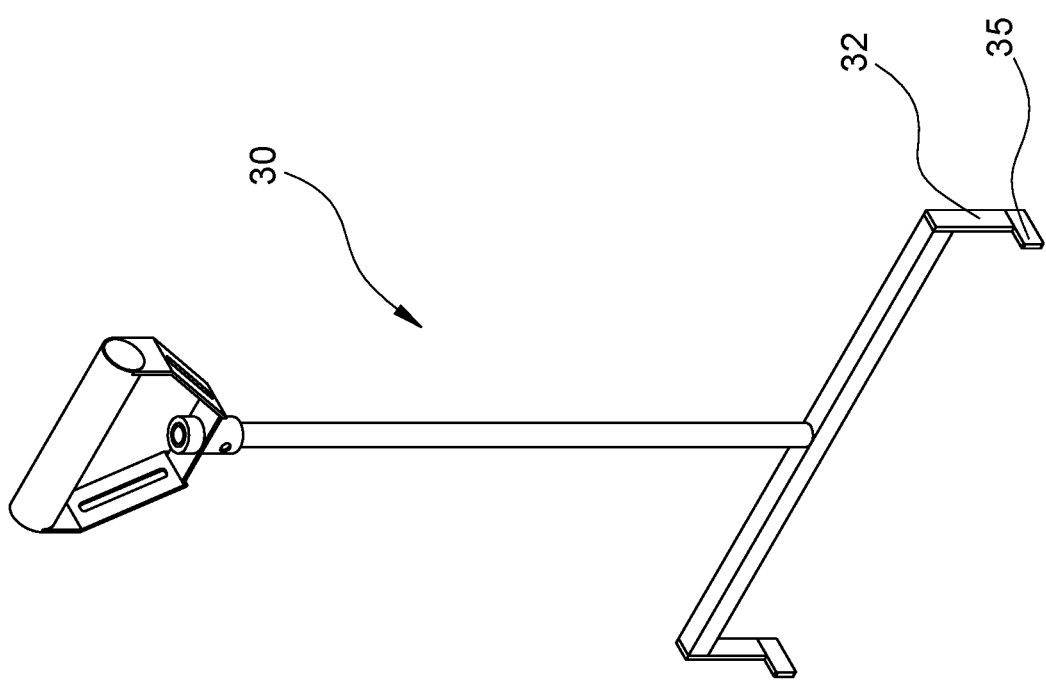
FIG. 5 is an axonometric view of the tool 30.

FIG. 5 illustrates an embodiment of a tool 30 that can be used to engage the slots 20 and undercuts 25 to open the lid 14. This tool 30 has two vertical rods 32 designed to be inserted into corresponding slots 20 in the top of a cable protector 10, as illustrated in FIGS. 2-4. Horizontal protrusions 35 at the lower ends of the vertical rods 32 removably engage the undercuts 25 beneath the lid 14 as depicted in the cross-sectional view provided in FIG. 3. The worker initially inserts the rods 32 of the tool 30 vertically downward into the slots 20 in the top of the cable protector 10. The horizontal protrusions 35 can be made to engage the undercuts 25 beneath the lid 14 either by slightly pivoting the upper end of the tool 30, or shifting the entire tool 30 slightly forward in the slots 20 toward the lid 14, so that the horizontal protrusions 35 extend beneath the lid 14. The user then exerts an upward force on the tool 30 to lift the lid 14 and access the channels 12 in the cable protector 10, as shown in FIG. 4.

It should be noted that the location, size, shape and proportions of these slots 20 and undercuts 25 are largely a matter of design choice. Preferably, the slots 20 are located on the top surface of the cable protector 10 adjacent to the side edge of the lid 14. as shown in FIGS. 1 and 2. This allows the corresponding undercuts 25 to extend a short distance beneath the lid 14. It should also be understood that the terms "slot," "opening" and "undercut" should be broadly construed. A relatively narrow slot offers the advantages of being visually unobtrusive, minimizing the risk of being a trip hazard, and minimizing the risk of the slot becoming obstructed with dirt or debris. However, the openings 20 could have a wide range of shapes, dimensions and proportions. For example, the slots 20 could be rectangular, square, semicircular, tapered or oval. Also, the openings 20 can have any desired orientation with respect to the cable protector 10. Similarly, the undercuts 25 can have any desired shape, dimensions and proportions.

FIGS. 6 and 7 illustrate an alternative embodiment of the present invention in which the slots 20 are located in the lid 14, rather than along the upper edge of the side ramp 15. As before, the lid 14 is hinged to the body of the cable protector 10 along one of its side edges. Preferably, the slots 20 extend downward from the top surface of the lid 14 adjacent to the opposing side edge to minimize the force required on the tool 30 to lift the lid 14. These slots 20 can extend completely through the lid 14, so that the lower lip of the slot 20 and the underside of the lid 14 serve as the undercut 25. When the lid 14 is closed, the channels 12 in the body of the cable protector 10 afford enough space for the lower ends 32 and horizontal projections 35 of the tool 30 to be inserted through the slots 20 in the lid, and for the horizontal projections 35 to extend beneath the lid 14, as shown in FIG. 7.

Figure 8:
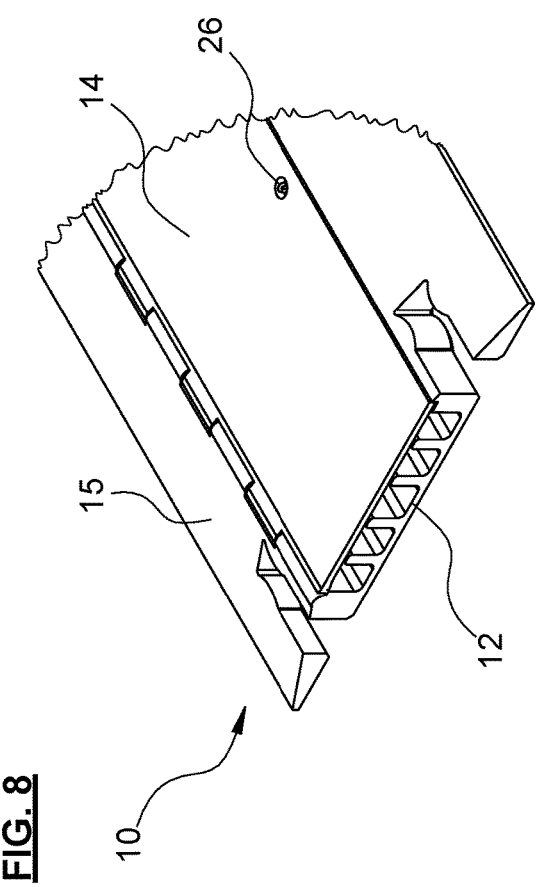
FIG. 8 is a detail top axonometric view of an alternative embodiment of a cable protector 10 with hooks 26 on the lid 14.
Figure 9:
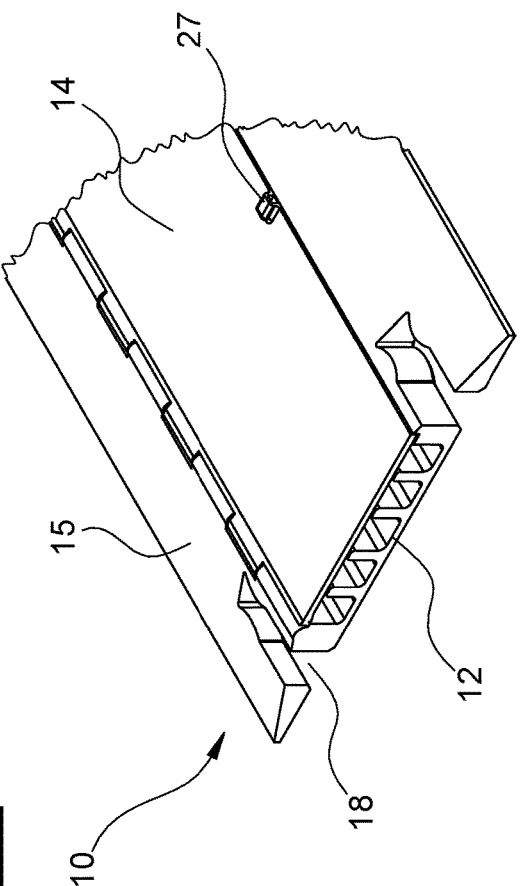
FIG. 9 is a detail top axonometric view of an alternative embodiment of a cable protector 10 with raised features 27 on the lid 14.

FIG. 8 show an alternative embodiment using hooks or eye-bolts 27 secured to the lid 14 as the tool engagement features. These tool engagement features can be embedded in the lid 14 or mounted in recesses in the upper surface of the lid 14 to minimize the risk of any protrusions in the upper surface of the lid 14 becoming a trip hazard to pedestrians. Similarly, FIG. 9 shows raised features 27 on the upper surface of the lid 14 that can be removable engaged by the tool 30.

Figure 10:
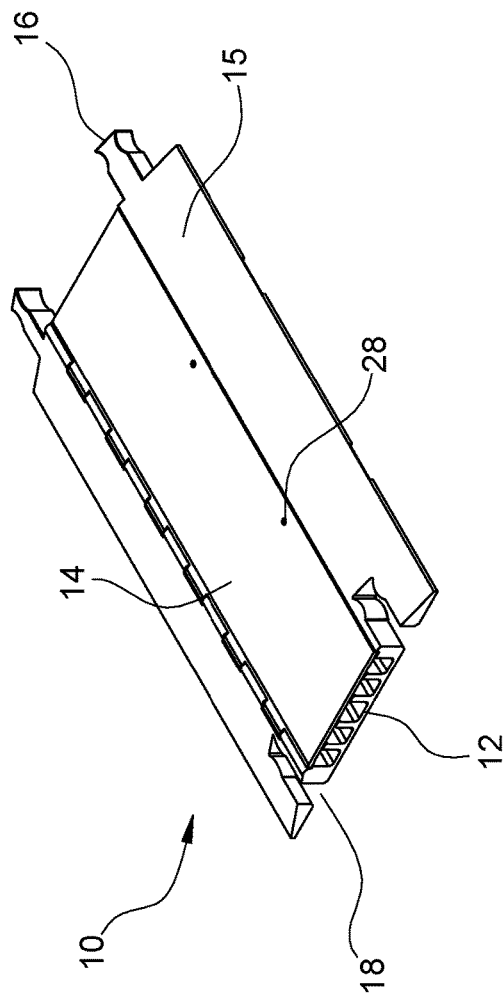
FIG. 10 is a top axonometric view of an alternative embodiment of a cable protector 10 with threaded inserts 28 in the top surface of the lid 14.
Figure 11:
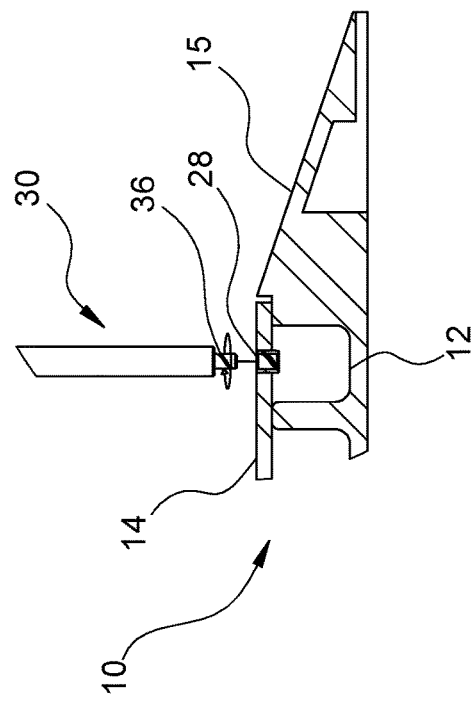
FIG. 11 is a detail vertical cross-sectional view corresponding to FIG. 10, but also showing the threaded lower end 36 of the tool 30.

FIGS. 10-11 show another embodiment using threaded inserts 28 as the tool engagement features. These threaded inserts 28 are embedded in the upper surface of the lid 14. The tool 30 has a threaded lower end 36 that can be threaded into the threaded inserts 28 by a quick twisting motion (e.g., a quarter turn) to removably engage the tool 30 to the lid 14, as shown in FIG. 11.

Figure 12:
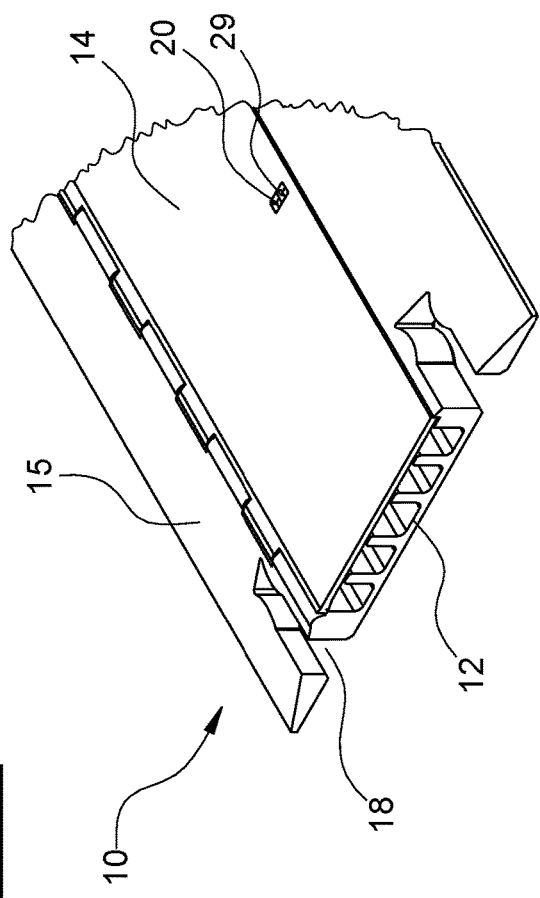
FIG. 12 is a detail top axonometric view of an embodiment of a cable protector 10 with a tool engagement feature in the form of a pin 29 extending across an opening 20 in the lid 14.

FIG. 12 shows an embodiment having a pin 29 extending across an opening 20 in the upper surface of the lid 14 as the tool engagement feature. The ends of the pin 29 can be embedded in the wall of the lid 14 surrounding the opening 20 during the molding process.

Figure 13:
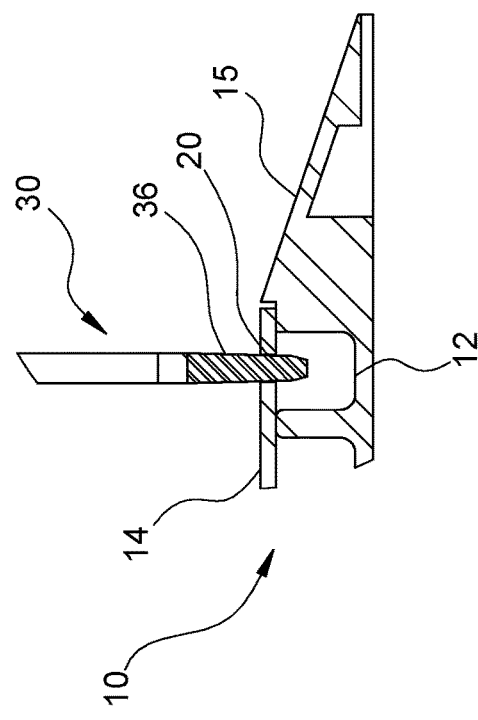
FIG. 13 is a detail cross-sectional view showing one of the lower ends 36 of the tool 30 in a friction fit with a hole 20 in the lid 14.

FIG. 13 depicts an embodiment of a cable protector in which the tool engagement feature is an opening 20 in the top surface of the lid 14. The lower end 36 of the tool 30 is slightly larger than the hole 20 and engages the hole 20 by a friction fit. The lower end 36 of the tool 30 is initially pushed into the hole 20 to establish a connection. The user can then lift upward on the tool 30 to raise the lid 14. Frictional engagement between the tool 30 and hole 20 can be maximized by lifting upward on the tool with a slightly off-vertical force vector.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A modular cable protector system comprising:
a cable protector with an upper surface and having:
(a) opposing side ramps defining portions of the upper surface;
(b) end connectors for connecting a plurality of cable protectors together in series;
(c) at least one channel extending in parallel between the side ramps;
(d) a lid removably covering the at least one channel and defining a portion of the upper surface when closed;
(e) a tool engagement feature accessible on the upper surface having an opening in the upper surface having a lower portion, and an undercut extending horizontally from the lower portion of the opening beneath the lid; and
a tool for removably engaging the tool engagement feature having an elongated vertical member with a horizontal protrusion at its lower end for removably insertion into the opening with the horizontal protrusion extending into the undercut beneath the lid, said tool extending upward from the tool engagement feature to enable the lid to be opened by lifting upward on the tool.

2. The modular cable protector system of claim 1 wherein the lid has a side edge, and the opening extends into the upper surface of the cable protector adjacent to the side edge of the lid.

3. The modular cable protector system of claim 1 wherein the lid further comprises opposing first and second side edges, with a hinge along the first side edge connecting the lid to cable protector adjacent to one of said side ramps, wherein the opening extends into the upper surface of the side ramp adjacent to the second side edge of the lid.

4. The modular cable protector system of claim 3 wherein the undercut extends beneath the lid into the channel adjacent to the side ramp.

5. The modular cable protector system of claim 1 wherein the opening extends into the upper surface of the lid.

6. The modular cable protector system of claim 5 wherein the lid further comprises opposing side edges adjacent to the side ramps, and wherein the lid is hinged to the cable protector along one side edge and the opening extends through the lid adjacent to the second side edge.

7. A modular cable protector system comprising:
a cable protector with an upper surface and having:
(a) opposing side ramps defining portions of the upper surface;
(b) end connectors for connecting a plurality of cable protectors together in series;
(c) at least one channel extending in parallel between the side ramps;
(d) a lid removably covering the at least one channel and defining a portion of the upper surface when closed;
(e) an opening in the upper surface having a lower portion; and
(f) an undercut extending horizontally from the lower portion of the opening beneath the lid; and
a tool having an elongated vertical member with a horizontal protrusion at its lower end for removable insertion into the opening with the horizontal protrusion extending into the undercut beneath the lid, to thereby open the lid by lifting upward on the tool.

8. The modular cable protector system of claim 7 wherein the lid has a side edge, and the opening extends into the upper surface of the cable protector adjacent to the side edge of the lid.

9. The modular cable protector system of claim 7 wherein the lid has a side edge, and the opening extends into the upper surface of the side ramp adjacent to the side edge of the lid.

10. The modular cable protector system of claim 9 wherein the undercut extends beneath the lid into the channel adjacent to the side ramp.

11. The modular cable protector system of claim 7 wherein the opening extends into the upper surface of the lid.

12. The modular cable protector system of claim 11 wherein the lid further comprises opposing side edges adjacent to the side ramps, and wherein the lid is hinged to the cable protector along one side edge and the opening extends through the lid adjacent to the second side edge.

* * * * *